United States Patent
Powell (10) Patent No.: US 9,151,444 B2
(45) Date of Patent: Oct. 6, 2015

(54) DUAL-SERIES FEEDER LUBRICATION SYSTEM

(71) Applicant: FD JOHNSON COMPANY, Twinsburg, OH (US)

(72) Inventor: John Powell, Ravena, OH (US)

(73) Assignee: FD Johnson Company, Twinsburg, OH (US)

( * ) Notice: Subject to any disclaimer, the term of this patent is extended or adjusted under 35 U.S.C. 154(b) by 462 days.

(21) Appl. No.: 13/632,817

(22) Filed: Oct. 1, 2012

(65) Prior Publication Data

US 2014/0090929 A1  Apr. 3, 2014

(51) Int. Cl.
- F16N 25/00 (2006.01)
- F16N 25/02 (2006.01)
- F16N 29/04 (2006.01)

(52) U.S. Cl.
CPC .............. *F16N 25/02* (2013.01); *F16N 29/04* (2013.01); *F16N 2260/02* (2013.01)

(58) Field of Classification Search
CPC ...... F16N 25/02; F16N 29/04; F16N 2260/02
USPC ..................................................... 184/6, 6.4
See application file for complete search history.

(56) References Cited

U.S. PATENT DOCUMENTS

| | | | | |
|---|---|---|---|---|
| 2,183,986 A | * | 12/1939 | Corey | 184/7.4 |
| 2,792,911 A | * | 5/1957 | Harter | 184/7.4 |
| 3,086,614 A | * | 4/1963 | Sensui et al. | 184/7.4 |
| 3,219,146 A | * | 11/1965 | Leese et al. | 184/6 |
| 3,229,786 A | * | 1/1966 | Robson et al. | 184/7.4 |
| 3,337,003 A | * | 8/1967 | Acker | 184/7.4 |
| 3,406,790 A | * | 10/1968 | Gruber | 184/6 |
| 3,414,085 A | * | 12/1968 | Fujita | 184/7.4 |
| 3,459,278 A | * | 8/1969 | Callahan | 184/6 |
| 3,783,973 A | * | 1/1974 | Kurten et al. | 184/7.4 |
| 4,044,924 A | * | 8/1977 | Saretzky | 222/250 |
| 4,180,090 A | * | 12/1979 | Bemba | 137/106 |
| 4,364,452 A | * | 12/1982 | Crago | 184/7.4 |
| 4,393,958 A | * | 7/1983 | Saretzky | 184/7.4 |
| 4,502,567 A | * | 3/1985 | Kärcher | 184/7.4 |
| 4,520,902 A | * | 6/1985 | Snow | 184/7.4 |
| 4,572,331 A | * | 2/1986 | Powell et al. | 184/7.4 |
| 4,712,649 A | * | 12/1987 | Saam | 184/7.4 |
| 5,497,852 A | * | 3/1996 | Little et al. | 184/7.4 |
| 8,960,236 B2 | * | 2/2015 | Klaphake et al. | 137/884 |

* cited by examiner

*Primary Examiner* — William A Rivera
*Assistant Examiner* — Michael Riegelman
(74) *Attorney, Agent, or Firm* — Gordon D. Kinder (57) ABSTRACT

The invention pertains to a centralized combination grease and/or oil lubricating system for lubricating bearings where a dual line parallel system is connected to a series progressive system with an inlet designed not to halt the flow of lubrication to the entire system if a single lubrication point becomes blocked but where a single terminal sensor will still alert the user of the blockage to the single lubrication point and a method of using the same.

16 Claims, 11 Drawing Sheets

DUAL-SERIES FEEDER LUBRICATION SYSTEM

FIELD OF THE INVENTION

The invention relates generally to a centralized combination grease and/or oil lubricating system for lubricating bearings where a dual line parallel system is connected to a series progressive system with an inlet designed not to halt the flow of lubrication to the entire system if a single lubrication point becomes blocked but where a single terminal sensor will still alert the user of the blockage to the single lubrication point and a method of using the same.

BACKGROUND OF THE INVENTION

The present invention relates to a centralized lubrication system for providing a grease or oil lubricant to a plurality of bearing points used in a multitude of industrial and commercial applications. Although the prior art teaches many systems for centralized lubrication of multiple bearing points, all of these teachings demonstrate limitations that the present invention addresses and overcomes.

Centralized automatic systems for providing lubrication to various moving parts such as bearings in machinery are generally known in the art. These systems allow for predetermined quantities of common lubricants such as grease and oil to be automatically distributed to a plurality of machinery points at regular intervals without the need for manual human intervention.

Prior art lubrication systems are generally either single line progressive (series progressive) or dual line parallel (parallel) in design. Series progressive systems operate by using pistons to move back and forth in a specific bore. A pump pushes lubricant from a reservoir through a single supply line which is connected to a number of metering valves as required for the particular application. As the lubricant reaches a metering valve, a dispensing piston is shifted in one direction to allow the lubricant to flow through the bore directly to the machinery requiring lubrication. There are generally pluralities of dispensing pistons in a block that are connected in series, or one after the other. The function of each distal piston in the system is directly dependant on the immediately proximal piston shifting to permit the flow of lubrication through and past that proximal point. Therefore, if an upstream piston in the series does not shift due to a problem such as a supply line blockage for example, all of the pistons further downstream or distal to that point will not receive a flow of lubrication to shift those pistons and lubricate those distal lubrication points.

U.S. Pat. No. 3,995,717 to Kroffke describes a centralized series progressive lubrication system where several lubricant injectors function in a sequential manor so that each downstream injector is fed only when the immediately corresponding piston is displaced by the flow of lubricant past that point in the system. This invention combined a system of lubricant feeders connected in series with corresponding injectors to deliver the lubricant to a plurality of points in sequence. This combination allows for the addition of additional injectors as needed without redesigning the entire feeder supply system but while still maintaining a sequential pattern of lubrication to points in the system.

In another example of a series progressive centralized lubrication system, U.S. Pat. No. 4,105,094 to Callahan utilizes a single line to supply lubrication to a plurality of bearing points arranged in series. As in the Kroffke patent, the downstream points only receive a supply of lubrication when the preceding piston in the supply line is displaced allowing lubricant to flow past to the bearing point and the next piston in the series. Once all of the points receive lubrication, a single check valve at the end of the system operates and the flow of lubricant reverses to return unused lubricant back through the same line.

Parallel automatic lubrication systems utilize two lines to move hydraulically adjustable valves or pistons and permit flow of lubricant to a plurality of machinery points. In this system, a pump pressurizes one of the lines while simultaneously venting the second line in the system. Once the system is pressurized, metering valves operate simultaneously to lubricate bearing points. Since each bearing point is lubricated simultaneously, the distal points are not directly dependant on the function of pistons up stream or proximally located in the system. Once a specific pressure is attained, the pump disengages and a valve opens to redirect the remaining lubricant through the second line in the system which functions as a return line to the reservoir. However, the next time that the pump pressurizes the system, the lines reverse uses and the second line becomes the distribution line and the first line becomes the return line.

An example of a two line system is described in U.S. Pat. No. 4,390,083 to Saretzky where a dual conduit system uses two feed conduits to supply lubricant to a plurality of points that require different amounts of lubricant. The two line system has an outlet connected to a progressive distributor control chamber and the pressure inlet connected to the dual feed conduits. This permits the system to provide differing amounts of lubricant to different rubbing points within the system at a single system pressure by adjusting each individual progressive distributor control chamber.

Each of these systems and combination systems has advantages and disadvantages. Series progressive systems are cyclical in operation, so they are easy to monitor for blockages in the line. If a blockage occurs, the locally blocked piston fails to shift and a sensor transmits an alarm. Additionally, since pistons move back and forth in their respective bore, only a single line is necessary to supply lubricant.

However, since these systems work on resistance to flow pressure in series, they will be either significantly limited in length, for example only 3-10 pistons, or be under extremely high pressure due to the viscosity of the lubricants used for industrial applications. Also, since many industrial processes require long machining runs, a system limited in length may not be ideal or practical for many applications. Another disadvantage is that any blockage in the system necessitates shutting down the entire run for repair since they are connected in series under pressure resulting in costly delays.

Parallel systems likewise have advantages and disadvantages. Since metering valves operate simultaneously, a parallel system allows for a much longer run with a larger amount of metering points since there is not a significant drop in the overall system pressure throughout the entire line. This is better suited for many larger industrial machines with a multitude of points or bearings that require lubrication. Also, if a particular point fails, the entire system need not be shut down while a single injector is replaces. This allows for a less costly repair while keeping the machine online and in service.

However, if a blockage does occur in the system, there is no way to know unless a sensor is placed at each lubrication point at increased cost. Unlike in the series system, pump pressure would not increase so there would be no outward sign of failure until the bearing point failed or burned out completely at a much greater expense than replacing only the injector. Additionally, the initial material and installation cost is greater due to the system having more than one line.

Many industrial central lubrication system applications, such as those employed in steel mills, require a longer length system that will have a low pressure drop where failure of a lubrication point is easily identifiable but where replacement of the failed lubrication point will not shut require shutting down the entire system. Therefore, a need remains for a centralized lubrication system capable of lubricating a plurality of bearing points over long runs through a hybrid combination of the above systems.

More specifically, a need still exists for a centralized combination grease and/or oil lubricating system that takes advantage of the benefits of both a series progressive system and a dual line parallel system while overcoming the individual disadvantages of both systems when used alone and method of the same.

SUMMARY OF THE INVENTION

Accordingly, the present invention overcomes the limitations of the prior art by providing a unique and useful centralized lubrication system that combines a dual line parallel system and at least a series progressive (feeder) system with an inlet designed to not impede or stop the flow of lubrication to the rest of the system if a single lubrication point or piston becomes blocked and to provide warning from a sensor on the last piston in the feeder system to alert the user of the blockage anywhere in the feeder system.

Consequently, the following presents a simplified summary of the invention in order to provide a basic understanding of some aspects of the invention. This summary is not an extensive overview of the invention. It is intended to neither identify key or critical elements of the invention nor delineate the scope of the invention. Its purpose is to present some concepts of the invention in a simplified form as a prelude to the more detailed description that is presented later.

It is an object of the present invention to provide a centralized automatic lubrication system that combines a dual line parallel system with at least a series progressive system to lubricate a plurality of friction points in machinery with grease and/or oil.

It is a further object of this invention to present a centralized automatic lubrication system where a dual line parallel system proximal portion feeds at least a series progressive system distal portion with a unique inlet.

It is an object of the present invention to provide a combination centralized automatic lubrication system where the flow of lubricant in a dual parallel portion causes pistons in a series progressive portion only shift in one direction only.

It is an object of the present invention to provide a combination centralized automatic lubrication system capable of handling pressures up to 5000 psi.

It is yet a further object of the present invention to provide a combination centralized automatic lubrication system where only a single sensor at the end of a first series progressive (feeder) section is necessary to alert a user of a blockage in the first feeder system while still allowing a plurality of other feeder sections in the system to flow lubricant.

It is another object of the present invention to provide a combination centralized automatic lubrication system that is longer in length than known series progressive systems.

It is an additional object of the invention to provide a combination centralized automatic lubrication system with a series progressive portion that does not halt the flow of lubricant to the entire system if a blockage occurs.

It is an additional object of the invention to provide a combination centralized automatic lubrication system with plug and play parts that are easily removable and replaceable without needing to shut down the entire system.

It is yet a further object of the present invention to provide a combination centralized automatic lubrication system for use in businesses comprising steel mills, matching companies and stamping plants.

It is yet another object of this invention to provide a combination centralized automatic lubrication system with a dual line block inlet system for supplying at least a series progressive portion.

It is another embodiment of the present invention to provide a combination centralized automatic lubrication system for replacing existing dual line systems.

It is an additional object of the invention to provide a method of automatically lubricating a plurality of machinery using a combination centralized automatic lubrication system.

BRIEF DESCRIPTION OF THE DRAWINGS

Embodiments of the invention will now be described with reference to the accompanying drawings

DETAILED DESCRIPTION OF THE INVENTION

One or more implementations of the present invention will now be described with reference to the attached drawings, wherein like reference numerals are used to refer to like elements throughout. The invention relates generally to a centralized combination grease and/or oil lubricating system for lubricating bearings or other friction points in machinery with a combination dual line parallel and at least a series progressive system where an inlet from the parallel system connects to at least the series progressive portion and is designed not to halt the flow of lubrication to the entire system if a single lubrication point becomes blocked, and also where a single terminal sensor will still alert the user of the blockage to the single lubrication point and a method of lubricating friction points in industrial machinery using the same.

Figure 11:
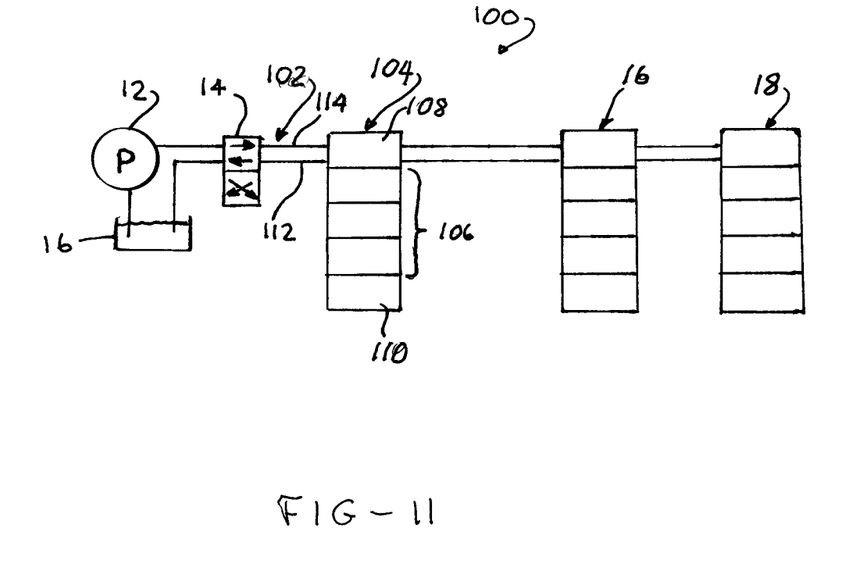
FIG. 11 illustrates a dual series feeder lubrication system including a pump, reservoir, a reversing valve, a dual line parallel section and a plurality of series progressive blocks.

Referring initially to FIG. 11, a schematic illustration of a dual-series feeder lubrication system 100 according to the preferred embodiment of the invention is shown. The dual-series feeder lubrication system 100 comprises a pump 12 with a reversing valve 14, a lubricant reservoir 16, a dual line parallel portion 102 that feeds at least a block 104 further comprising a series progressive portion 106. The block 104 further comprises an inlet section 108, the series progressive portion 106, and an end section 110.

Figure 1:
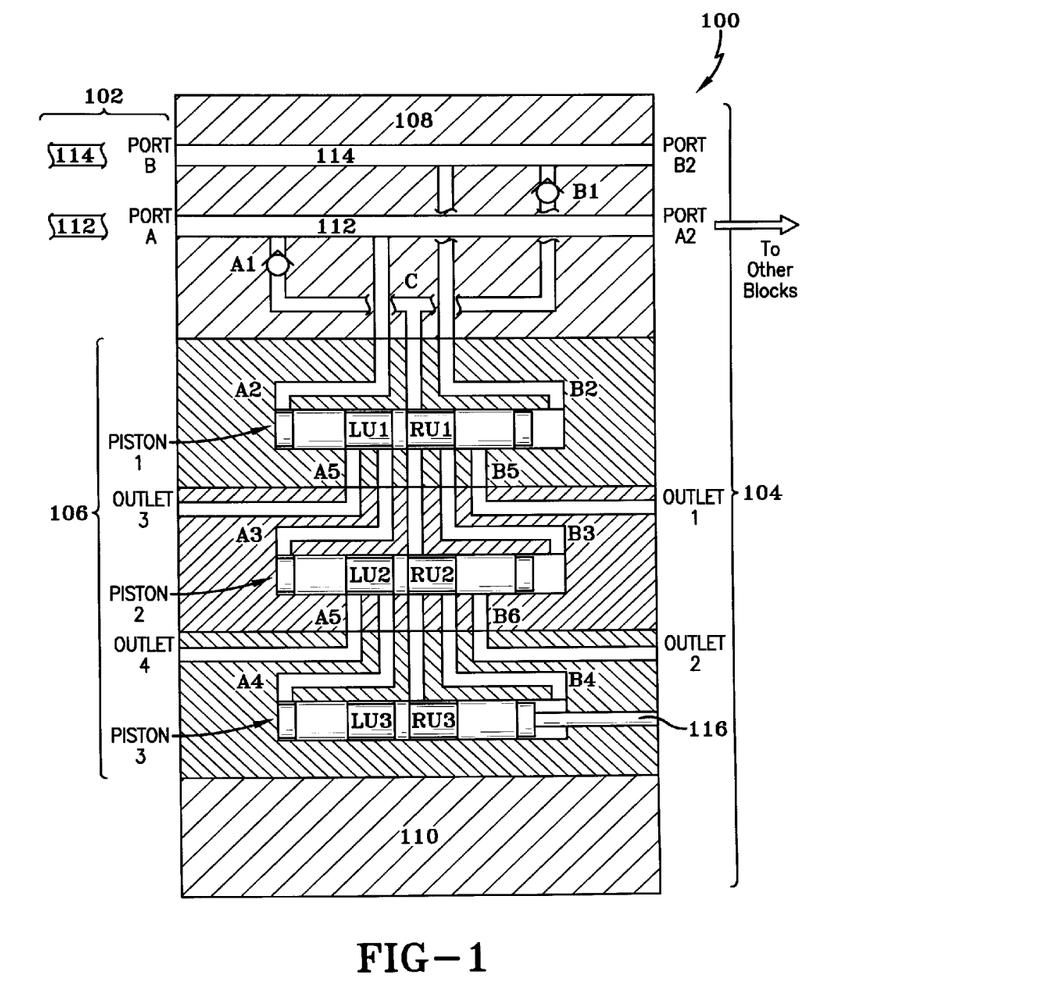
FIG. 1 illustrates a combination centralized automatic lubrication system comprising a dual line parallel lubrication portion that transitions into at least a series progressive portion through an inlet block.

In the two line parallel lubrication portion 102 (FIGS. 1-9), flow is provided from the lubricant reservoir via the pump through a first supply/return line 112 acting as a lubricant supply/return line to the block 104. The lubricant may be any oil or grease such as liquid or semisolid compounds, gear oils, pastes, cutting oils, synthetic compounds, food grade oils, high temperature and pressure lubricants, and any other material known to one of skill in the art for lubricating bearings or other friction points in machines. As the lubricant reaches the block 104, it enters through a first entry port (Port A) through which the first supply/return line 112 transects. The dual line portion 102 may either terminate at the end of the block 104, or the first supply/return line 112 may alternatively proceed through a first exit port (Port A2) as shown in FIG. 1 and may proceed to a plurality of additional blocks 16 and 18.

Unused lubricant is returned to the reservoir via a second supply/return line 114 which vents the system 100 and acts as a return line to the reservoir when the first supply/return line 112 is pressurized to act as the supply line. The second supply/return line 114, when acting as the return line, leaves the block 104 at a second exit port (Port B) located on the same side of the block as the first entry port (Port A). Additionally, if the block 104 is not the terminal block in the system, the second supply/return line 114 transects the block 104 and returning lubricant from the plurality of downstream blocks (not shown) through a second entry port (Port B2) which is on the opposite side of the block 104 as the second exit port (Port B). However, the dual-series feeder lubrication system 100 can reverse flow so that the second supply/return line 114 acts as the supply line and the first supply/return line 112 acts as the return line. In this instance, the ports reverse function so that the first entry port (Port A) becomes an exit port and the first exit port (Port A2) becomes an entry port for the first supply/return line 112 which is now acting as the return line, and the second exit port (Port B) becomes a supply/return line 114 which now acts as the supply.

The inlet section 108 of the block 104 comprises the ports (Port A, Port A2, Port B, Port B2) listed supra, the first and the second supply/return lines 112, 114, a first passage (A2), a first passage check valve (A1), a second passage (B2), a second passage check valve (B1), and a common passage (C). As demonstrated in FIG. 2, when the first supply/return line 112 provides a pressurized flow of lubricant to the block 104, the lubricant enters at the first entry port (Port A) and proceeds through the first passage (A2) which leads from the inlet section 108 to the series progressive portion 106 of the block 104.

The series progressive portion 106 comprises a plurality of pistons, a plurality of passages, a plurality of undercuts, and a plurality of outlets which will be described infra. While the embodiment in FIG. 2 demonstrates a system 100 having three pistons, the inventor contemplates a system where each block comprises twelve pistons where the flow sequence indicated will continue through all of the pistons. Additionally, the limitations on the number of pistons per block comprise the strength of the block material, the lubricant viscosity, and the pressure of the system.

The block material preferably comprises steel or a high strength steel alloy. This is desirable due to the high pressures that the system 100 may employ. However, any high strength material such as metals, alloys, and composite material that may be machined or manufactured and can tolerate the pressure requirements of the system 100 that are known to one of skill in the art may be used.

The physical requirements of the system 100 will vary based on the pressure, temperature, and length requirements for the particular application. Applications may comprise, but are not limited to machinery used in steel mills, food processing, stamping, bottling, canning, and the like. Anything requiring periodic lubrication may benefit from the system 100. Due to the viscosity of the lubricants employed in many industrial applications, the block 104 commonly will handle pressures of between 100-500 pounds per square inch (psi) for liquid lubricants and between 500-1500 psi for semisolid lubricants. While these are common pressure ranges, these pressures are not meant as limitations, as a lower pressure, 10 psi for example may only be required in a very small system and pressures of 6000 psi or greater may be required for a large system.

While the system 100 may comprise only a single block, the benefits of the system 100 become more apparent when a plurality of blocks is employed. A parallel system by itself enjoys the advantage of having only a small drop in pressure across the entire length thereby running at a lower pressure than a comparable series progressive system. Since series progressive systems require higher pressures to lubricate the same number of friction points, they are necessarily shorter in length due to the maximum pressure that the system can safely handle. Therefore, by employing the plurality of blocks along a parallel system, the pressure requirement will be much lower than that requires if the entire system was in series which permits a much longer length system. For example, a series system by itself may only extend a few feet, where a combined system 100 may run for a few hundred feet.

Additionally, any blockage in the series progressive portion 106 will only affect downstream points in that series portion only. There will still be flow of lubrication to any other blocks in the system 100 as the plurality of blocks are connected in parallel and thereby operate independently of each other. This allows an affected block to be removed and replaced while still permitting the rest of the system 100 to remain functional and in service.

The block 104 creates an inlet for a parallel system to combine with a series progressive system. Electronic circuitry employed with the block 104 may allow for parameters comprising differing amounts of lubrication, viscosity readings, capacitance sensing, timing, of other requirements for the lubrication points fed by that block. The blocks 104 may be integrated or retrofitted into existing parallel systems thereby extending the lifespan and versatility of the systems.

Figure 2:
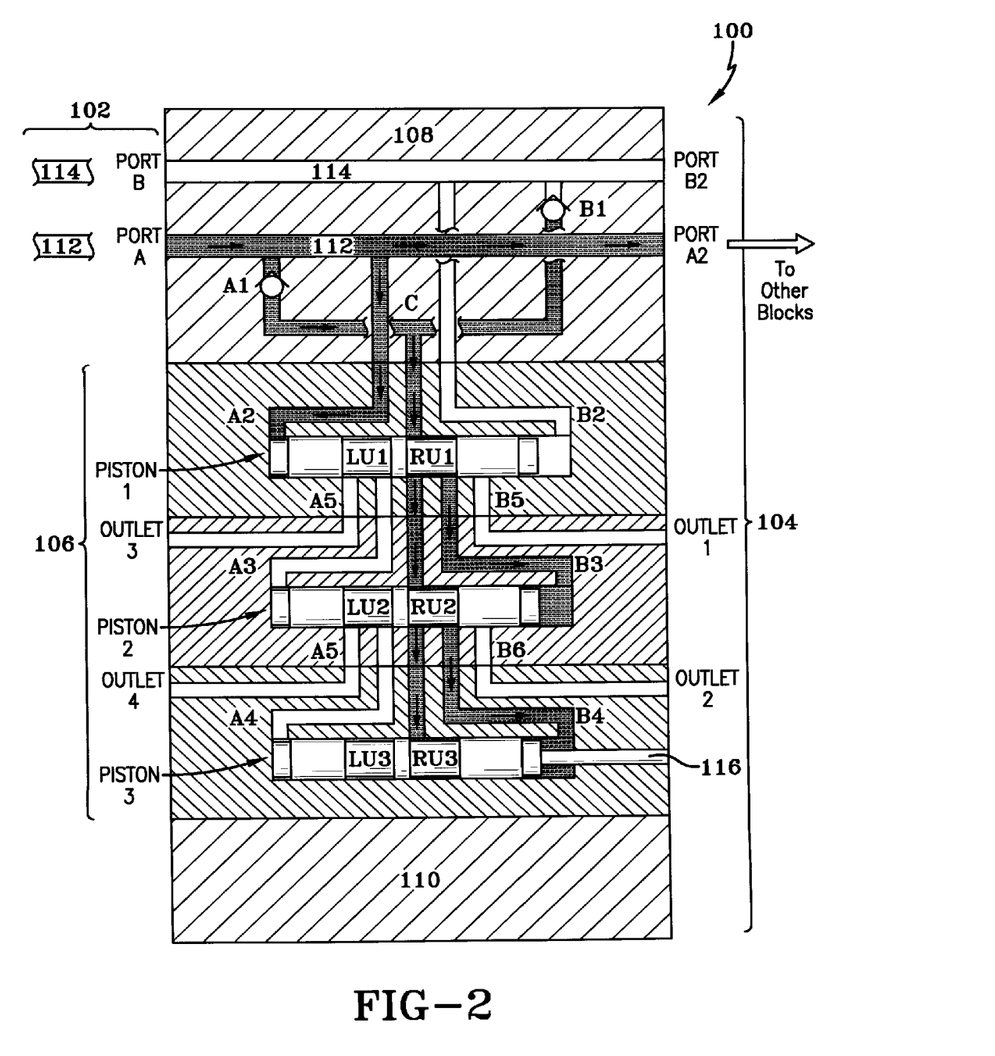
FIG. 2 illustrates a combination centralized automatic lubrication system where a lubricant flow entering an inlet block from a first entry port (Port A) proceeds into a series progressive portion to a first piston (Piston 1).
Figure 3:
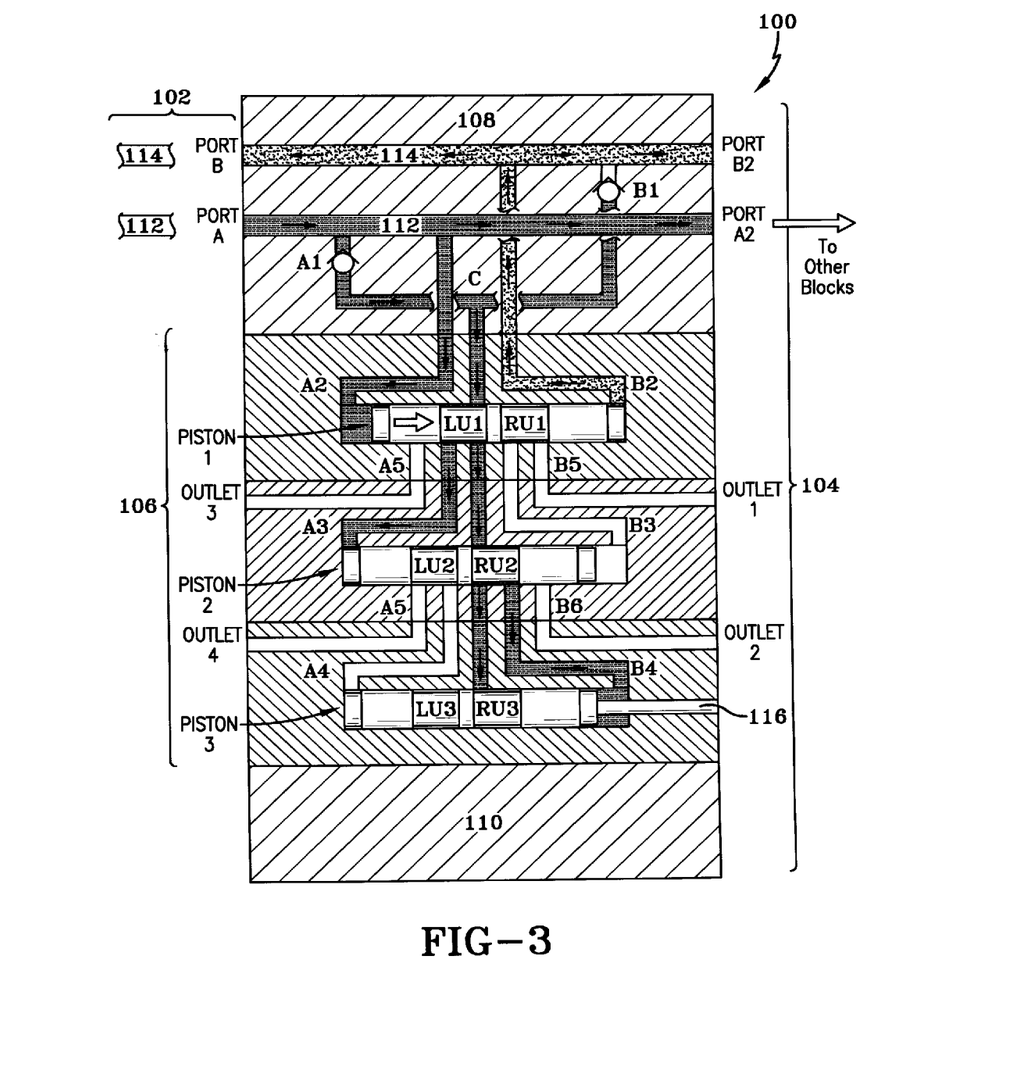
FIG. 3 illustrates a combination centralized automatic lubrication system where lubricant moved by a first piston (Piston 1) is vented through second exit ports (Port B and/or B2).
Figure 4:
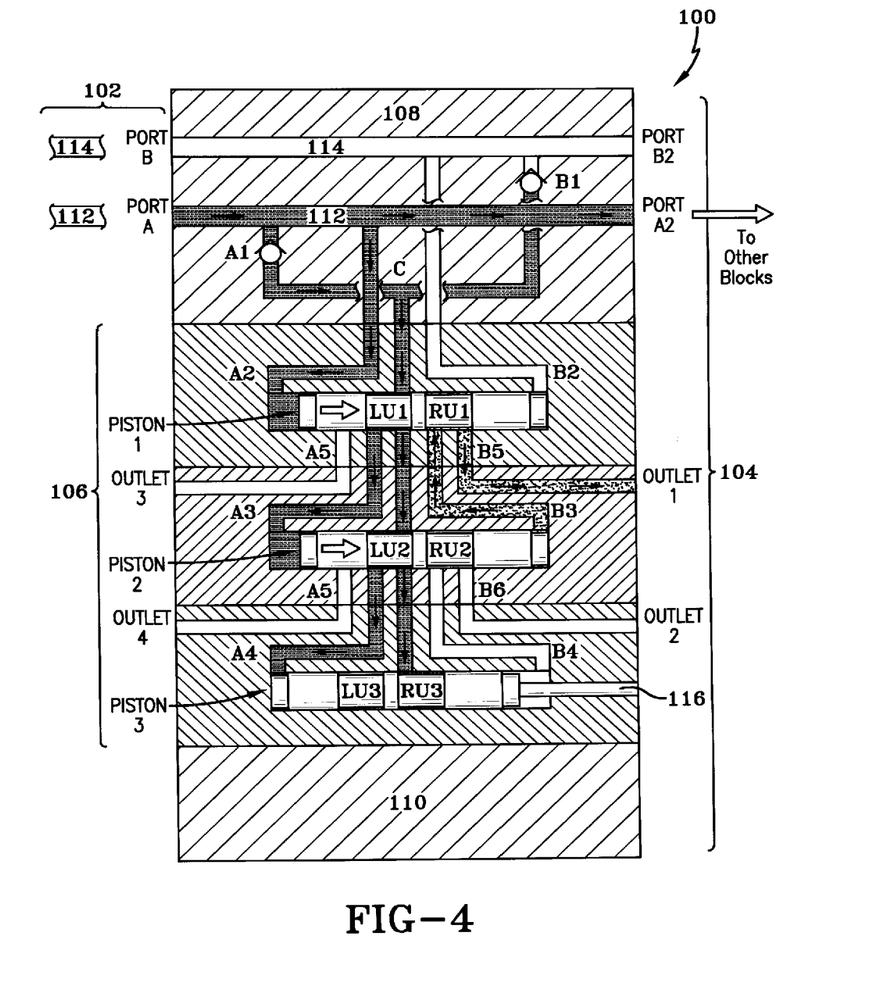
FIG. 4 illustrates a combination centralized automatic lubrication system where a flow of lubricant moves past a first piston (Piston 1) to a second piston (Piston 2) and lubricant moved by the second piston (Piston 2) moves to a first outlet (Outlet 1).

Returning to the flow of lubricant ("the flow") in FIG. 2, it progresses through the first passage (A2) which enters the series progressive portion 106 of the block 104 where it encounters the left end of a first piston (Piston 1) causing the first piston (Piston 1) to shift to the right, as illustrated in FIG. 3. While this embodiment shows a flow of lubricant from left to right past the first piston (Piston 1), this is not meant as a limitation to the block 104 design. The block 104 could just as easily permit lubricant flow past any piston from right to left, top to bottom, bottom to top, or of any other piston orientation where the flow could be maintained to friction points as required by an individual machine specification. In any event as shown in FIG. 3, once the first piston (Piston 1) shifts to the right within its bore, a volume of lubricant on the right side of the first piston (Piston 1) is discharged through the second passage (B2) back to the second supply/return line 114 where it is vented through the second exit port (Port B and/or B2). Next, "the flow" then proceeds through the first passage check valve (A1), the common passage (C), a left undercut (LU1), of the first piston (Piston 1), and a third passage (A3) where it encounters the left end of a second piston (Piston 2) causing the second piston (Piston 2) to shift to the right in a similar manor to the shift of the first piston (Piston 1) as described supra. The flow of lubricant in the common passage (C) is prevented from entering the second supply/return line 114 by the second passage check valve (B1). Once the second piston (Piston 2) shifts to the right in its bore, FIG. 4 shows that a volume of lubricant on the right side of the second piston (Piston 2) is discharged through a fourth passage (B3), a right undercut (RU1) of the first piston (Piston 1), and a fifth passage (B5) where it exits the block 104 at a first outlet (Outlet 1). The first outlet (Outlet 1) feeds a lubricant injecting means (not shown) for supplying lubricant to a bearing, a rubbing point, or any other part of a device requiring lubrication.

Figure 5:
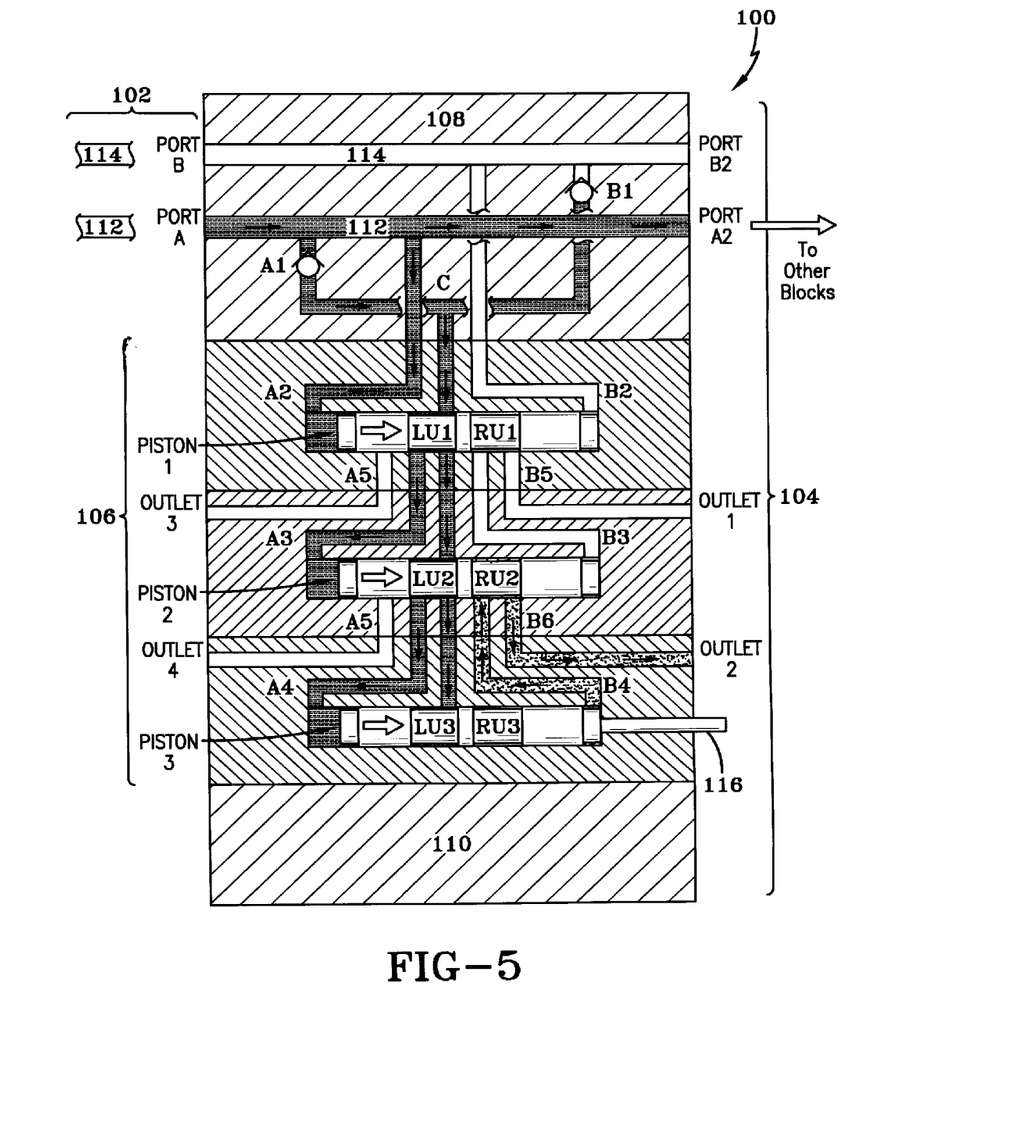
FIG. 5 illustrates a combination centralized automatic lubrication system where a flow of lubricant moves past a second piston (Piston 2) to a third piston (Piston 3) and lubricant moved by the third piston (Piston 3) moves to a second outlet (Outlet 2).

Sequentially, "the flow" continues through the common passage (C), a left undercut (LU2) of the second piston (Piston 2), and a sixth passage (A4) where it encounters the left end of a third piston (Piston 3) causing the third piston (Piston 3) to shift to the right in a similar manor to the shift of the first piston (Piston 1) as described supra. Once the third piston (Piston 3) shifts to the right, FIG. 5 shows that a volume of lubricant on the right side of the third piston (Piston 3) is discharged through a seventh passage (B4), a right undercut (RU2) of the second piston (Piston 2), and an eighth passage (B6) where it exits the block at a second outlet (Outlet 2). Similarly to the first outlet (Outlet 1) the second outlet (Outlet 2) feeds a lubricant injecting means (not shown) for supplying lubricant to a bearing, a rubbing point, or any other part of a device requiring lubrication.

Figure 6:
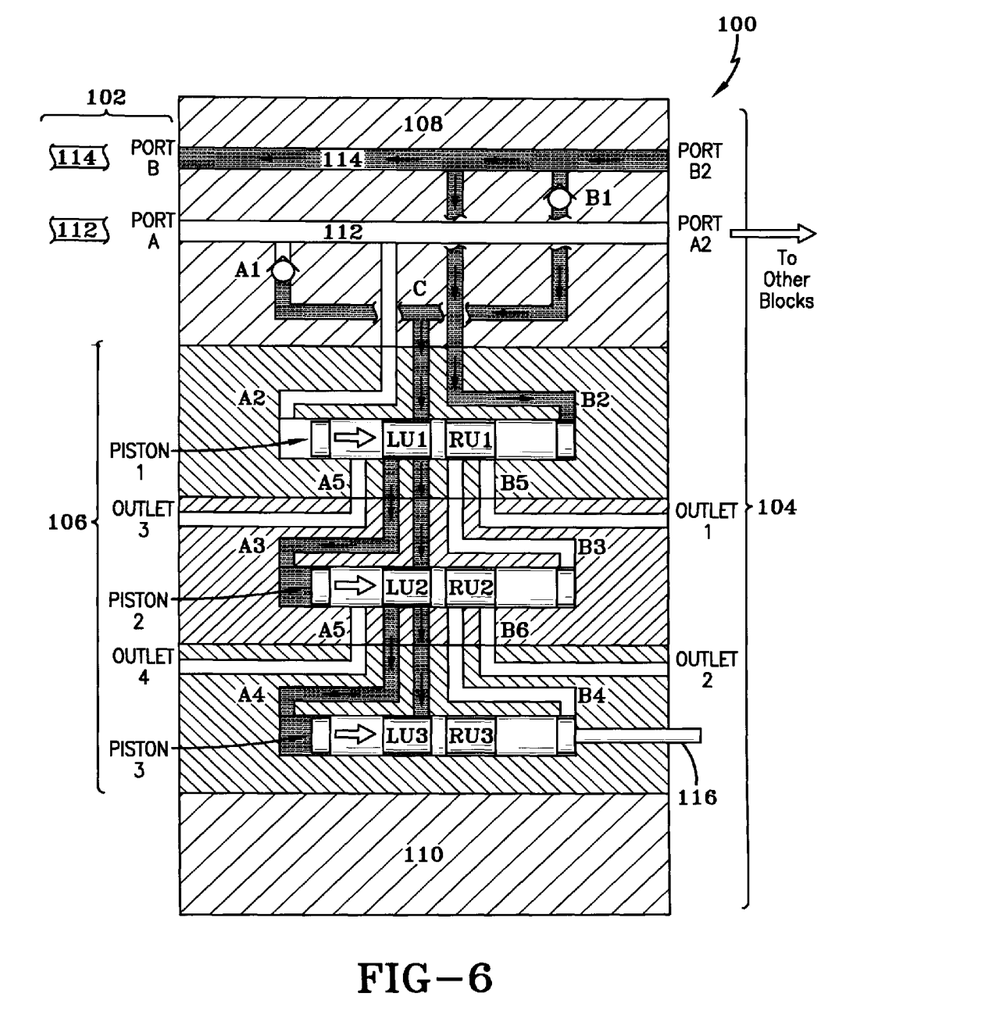
FIG. 6 illustrates a combination centralized automatic lubrication system where a lubricant flow entering an inlet block from a second entry port (Port B or B2) proceeds into a series progressive portion to a first piston (Piston 1).

At this point in the lubrication cycle, all of the pistons (Pistons 1, 2, and 3) have shifted to the right, have discharged a volume of lubricant, and will remain in the right shift position until "the flow" is switched from the first supply/return line 112 to the second supply/return line 114 and the first supply/return line 112 is vented instead of receiving pressure from the pump. As shown in FIG. 6, once "the flow" switches over and the pump supplies lubricant under pressure to the second supply/return line 114, it enters the block 104 at the second exit port (Port B) which is re-tasked as an entry point for lubricant. Similarly, the second entry port (Port B2) and the first entry port (Port A) become exit points and the first exit port (Port A2) becomes an entry point as the flow through the entire system 100 is reversed.

Returning to the flow of lubricant ("the flow"), it now progresses through the second passage (B2) which enters the series progressive portion 106 of the block 104 where it encounters the right end of a first piston (Piston 1) causing the first piston (Piston 1) to shift to the left. Then, once the first piston (Piston 1) shifts to the left within its bore, a volume of lubricant on the left side of the first piston (Piston 1) is discharged through the first passage (A2) back to the first supply/return line 112 where it is vented through the first entry port (Port A) which is now acting as an exit port due to the reverse of flow in the system.

Figure 7:
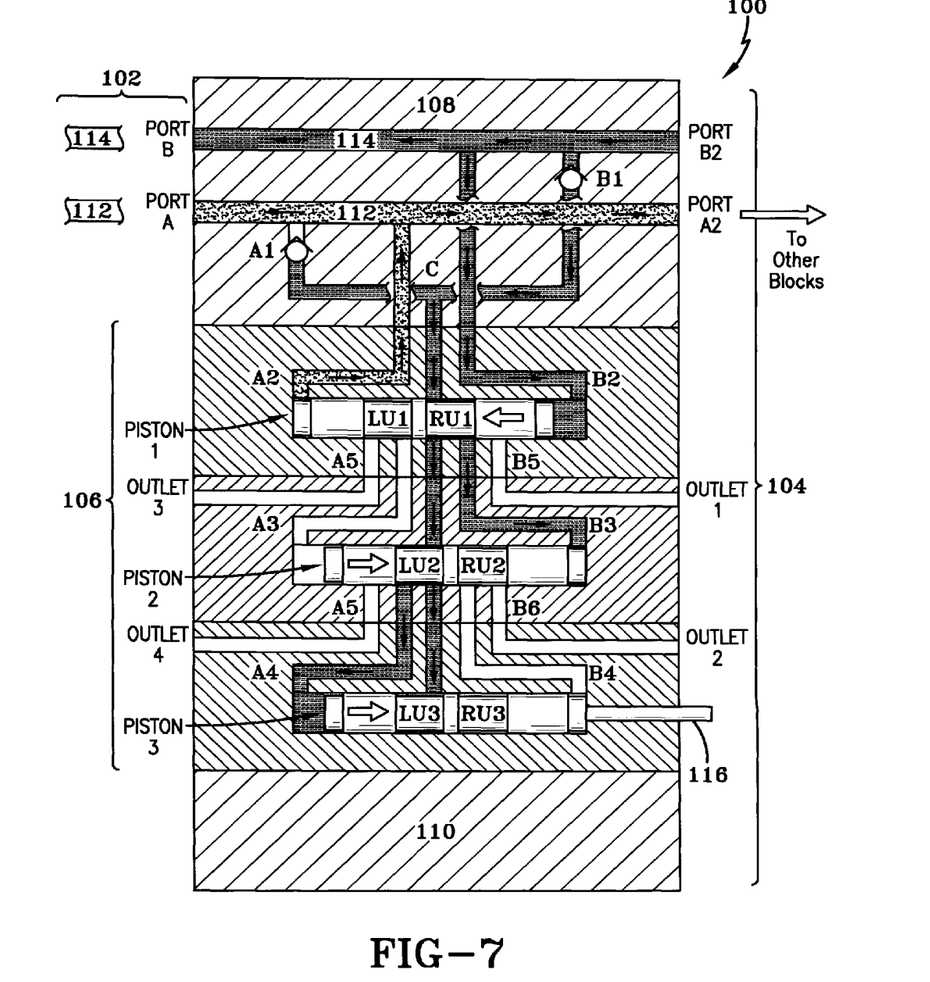
FIG. 7 illustrates a combination centralized automatic lubrication system where lubricant moved by a first piston (Piston 1) is vented through second exit ports (Port A and/or A2).
Figure 8:
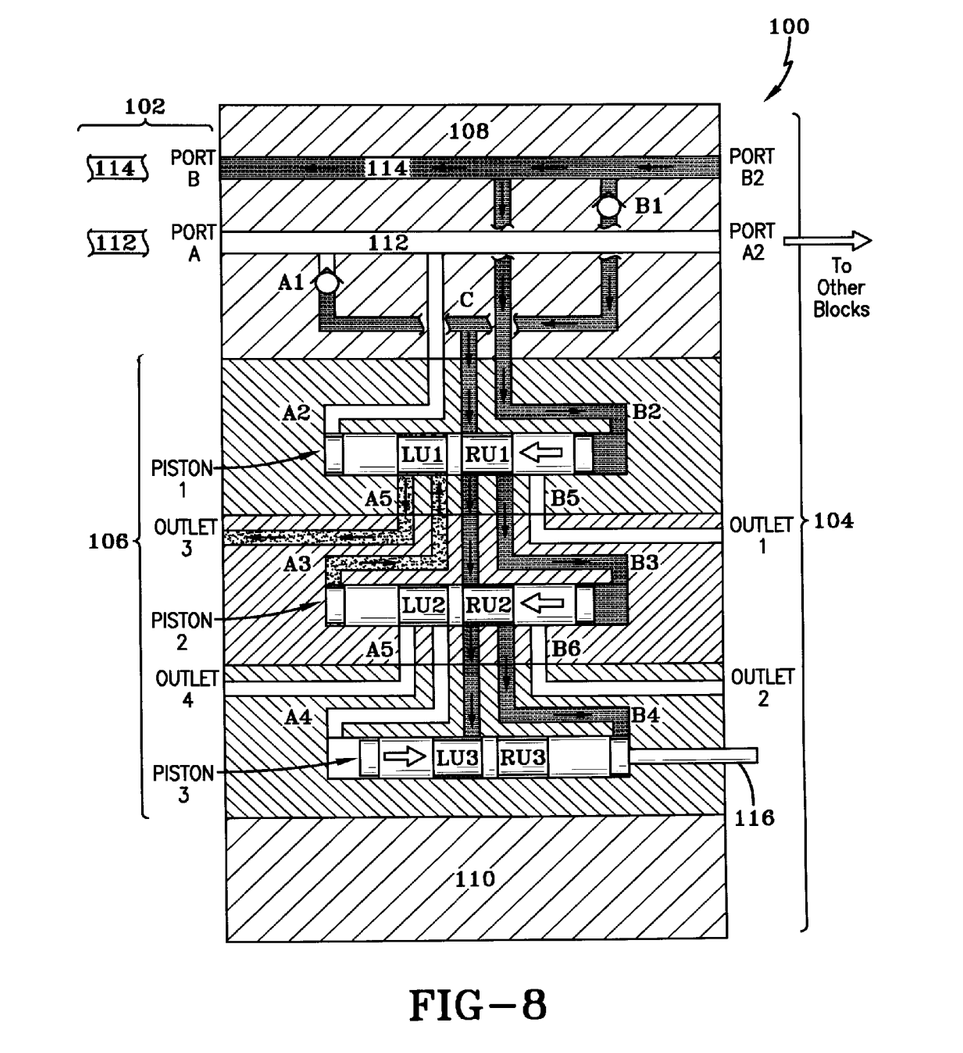
FIG. 8 illustrates a combination centralized automatic lubrication system where a flow of lubricant moves past a first piston (Piston 1) to a second piston (Piston 2) and lubricant moved by the second piston (Piston 2) moves to a third outlet (Outlet 3).

As shown in FIG. 7, "the flow" then proceeds through the second passage check valve (B1), the common passage (C), the right undercut (RU1), of the first piston (Piston 1), and the fourth passage (B3) where it encounters the right end of the second piston (Piston 2) causing the second piston (Piston 2) to shift to the left. The flow of lubricant in the common passage (C) is prevented from entering the first supply/return line 112 by the first passage check valve (A1). Once the second piston (Piston 2) shifts to the left in its bore, FIG. 8 shows that a volume of lubricant on the left side of the second piston (Piston 2) is discharged through the third passage (A3), the left undercut (LU1) of the first piston (Piston 1), and a ninth passage (A5) where it exits the block 104 at a third outlet (Outlet 3). Similarly to the previous outlets (Outlets 1 and 2), the third outlet (Outlet 3) feeds a lubricant injecting means (not shown) for supplying lubricant to a bearing, a rubbing point, or any other part of a device requiring lubrication.

Figure 9:
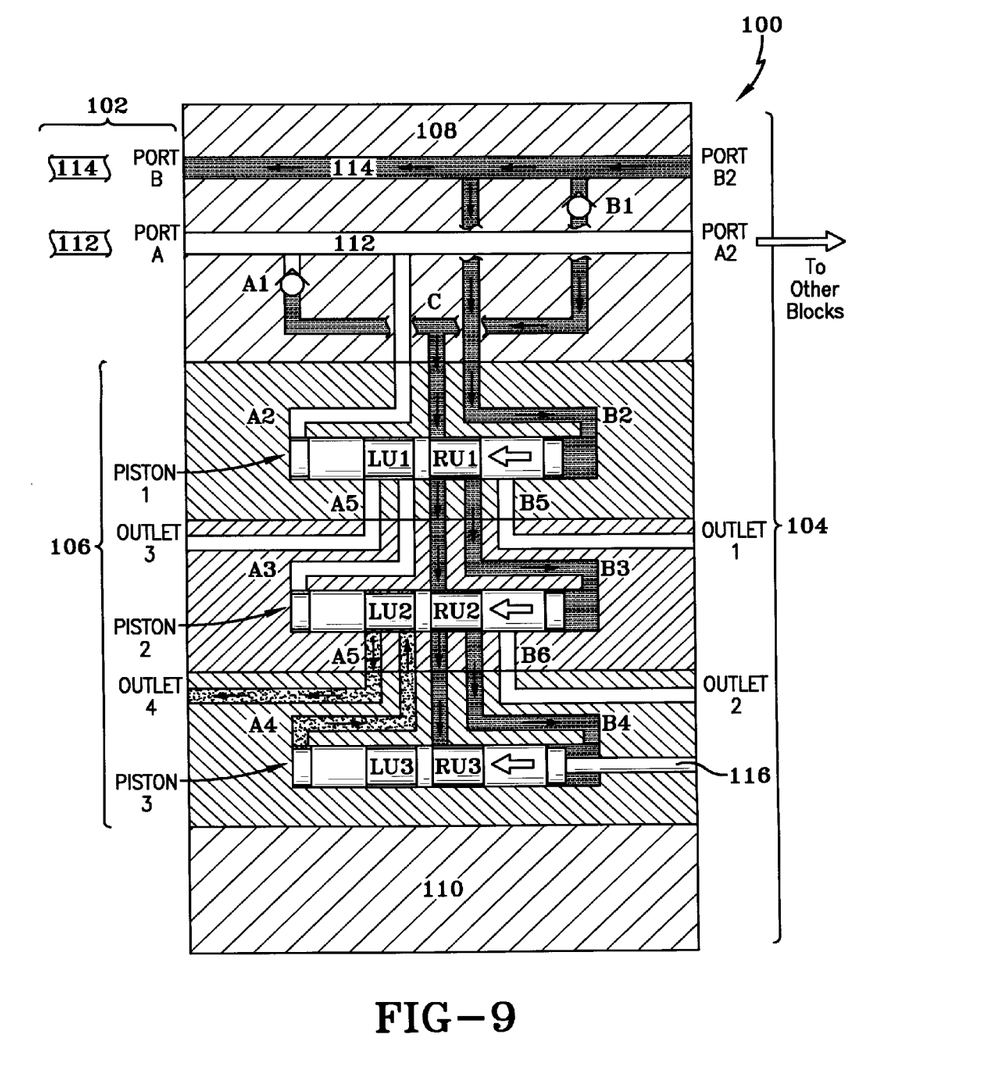
FIG. 9 illustrates a combination centralized automatic lubrication system where a flow of lubricant moves past a second piston (Piston 2) to a third piston (Piston 3) and lubricant moved by the third piston (Piston 3) moves to a fourth outlet (Outlet 4).

Next, "the flow" continues through the common passage (C), the right undercut (RU2) of the second piston (Piston 2), and the seventh passage (B4) where it encounters the right end of a third piston (Piston 3) causing the third piston (Piston 3) to shift to the left in a similar manor to the shift of the first piston (Piston 1) as described supra. Once the third piston (Piston 3) shifts to the left, FIG. 9 shows that a volume of lubricant on the left side of the third piston (Piston 3) is discharged through the sixth passage (A4), the right undercut (RU2) of the second piston (Piston 2), and a tenth passage (A6) where it exits the block at a fourth outlet (Outlet 4) where it feeds a lubricant injecting means (not shown) for supplying lubricant to a bearing, a rubbing point, or any other part of a device requiring lubrication.

At this point in the lubrication cycle, all of the pistons (Pistons 1, 2, and 3) have now shifted back to the left, have discharged a volume of lubricant, and will remain in the left shift or "starting" position until "the flow" is switched back from the second supply/return line 114 to the first supply/return line 112 and the second supply/return line 114 is vented.

This flow sequence of lubricant will repeat as "the flow" is alternated between the first and second supply/return lines 112, 114 respectively. The second piston (Piston 2) cannot shift in either direction until the first piston (Piston 1) has shifted either right or left depending on the direction of "the flow" and exposed its undercut to the common passage (C). Therefore, a last piston in the block 104, in this case the third piston (Piston 3), cannot shift and discharge volume until all of the previous pistons (Pistons 1 and 2) have shifted. Therefore as shown in FIG. 1, a cycle indicator 116 placed on the terminal piston (Piston 3 in this example) in the block 104 shows that all of the pistons (Pistons 1, 2, and 3) have shifted and discharged a volume of lubricant. The cycle indicator 116 may comprise an indicator pin, a cycle switch, a visible indicator, a warning light or alarm, an electronic or acoustic signal, and any other indicating means known to one skilled in the art.

Figure 10:
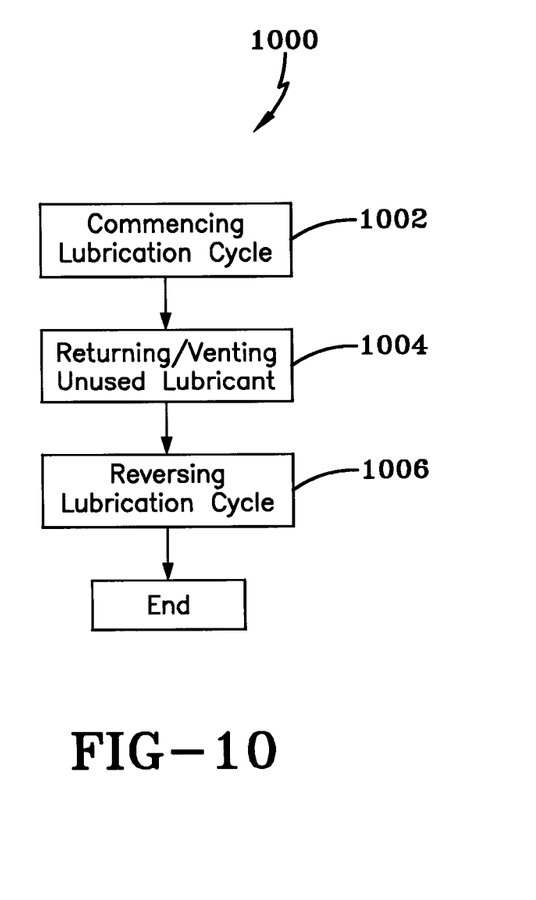
FIG. 10 demonstrates a method of automatically lubricating a plurality of friction points in machinery using a combination centralized automatic lubrication system.

Illustrated in FIG. 10 is an exemplary method for lubricating a plurality of bearing points on a piece of machinery at 1000 according to one or more aspects of the present invention. This method will be described with respect to FIGS. 1-9. Referring now to FIG. 10, an exemplary method is illustrated that may be advantageously employed in association with machinery used in a steel mill, however, this method is not limited to this application, but also applies to any other machinery or industry where lubrication is required such as food processing, stamping, bottling and canning, and the like.

The method 1000 begins at 1002 wherein a lubrication cycle commences when the dual-line parallel portion 102 of the system 100 is pressurized by a pump (not shown) so that a lubricant moves from a reservoir (not shown) and into a first supply/return line 112. The pressurized lubricant moves past a first inlet section 108 into a block. The lubricant moves through an inlet section 108 of the block 104 and into a series progressive portion 106 of the block 104. In the series progressive portion 106, the lubricant moves through a plurality of passages, a plurality of check valves, pistons, outlets, and a common passage as described supra.

Unused lubricant returns or vents to the reservoir 16 at 1004 (FIG. 10) via a second return/supply line 114 in the inlet section of the block 108 where it exits back to the dual-line parallel portion 102 at a second exit port (Port B). Optionally, some of the lubricant continues through the inlet section 108 of the block 104 via the first supply/return line 112 and exits through a first exit port (A2) where it continues on to supply a plurality of additional blocks (FIG. 11). The unused lubricant returns through the second supply/return line 114 in a similar manner to the first block 104.

The method then reverses itself and the first and second supply/return lines 112 and 114 respectively in the ports (Ports A, A2, B and B2) reverse roles while the lubricant moves through the system in the opposite direction so that all outlets (Outlet 1, 2, 3, and 4) receive lubricant. Optionally, a blockage in the system 100 will be indicated by a cycle indicator 116 located at the end of the last piston (Piston 3 in this example) in the block 104. The method then ends at 1008.

Although the invention has been illustrated and described with respect to one or more embodiments, implementations, alterations, and/or modifications may be made to the illustrated examples without departing from the spirit and scope of the appended claims. In particular regard to the various functions performed by the above described components or structures (assemblies, devices, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

What is claimed is:

1. A combination parallel and series feeder lubrication system, comprising:
a multi-line parallel lubrication component configured to provide lubricating material to at least a first lubricating block using at least two supply-return lines operating in parallel; and
a first series progressive component configured to provide a flow of the lubricating material to one or more first block lubricating points engaged with the first lubricating block in series;
wherein:
at least one of the at least two supply-return lines is in operational engagement with at least the first series progressive component; and
the multi-line parallel lubrication component is configured to provide the lubricating material to a second lubricating block if at least a portion of the first lubricating block becomes blocked.

2. The system of claim 1, further comprises a second series progressive component configured to provide the flow of the lubricating material to one or more second lubricating points engaged with the second lubricating block in series, wherein the at least one of the at least two supply-return lines is in operational engagement with at least the second series progressive component.

3. The system of claim 1, wherein the first series progressive component comprises a first piston component, wherein:
the first piston component is operationally engaged with a first supply-return line of the at least two supply-return lines; and
a portion of the first piston component is configured to be displaced in a first direction by a first directional flow of the lubricating material received at a first end of the first piston component, causing the lubricating material to flow to a second end of the first piston component.

4. The system of claim 3, wherein:
the second end of the first piston component is operationally engaged with a second supply-return line of the at least two supply-return lines; and
the first directional flow of the lubricating material from the second end of the first piston component is directed to the second supply-return line.

5. The system of claim 3, wherein the first series progressive component comprises a second piston component, wherein:
the second piston component is operationally engaged with the first supply-return line; and
a portion of the second piston component is configured to be displaced in the first direction by the first directional flow of the lubricating material received at a first end of the second piston component, causing the lubricating material to flow to a second end of the second piston component.

6. The system of claim 5, wherein:
the second end of the second piston component is operationally engaged with a first lubricating point line operationally engaged with one of the one or more first block lubricating points; and
the first directional flow of the lubricating material from the second end of the second piston component is directed to the first lubricating point line.

7. The system of claim 5, wherein the first directional flow of the lubricating material is merely received at the first end of the second piston component upon displacement of the portion of the first piston component in the first direction.

8. The system of claim 5, wherein the first directional flow of the lubricating material is merely received at a first end of a third piston component upon displacement of the portion of the second piston component in the first direction.

9. The system of claim 5, wherein:
the first piston component is operationally engaged with a second supply-return line of the at least two supply-return lines; and
the portion of the first piston component is configured to be displaced in a second direction by a second directional flow of the lubricating material received at the second end of the first piston component, causing the lubricating material to flow to the second end of the first piston component; and
the second directional flow of the lubricating material from the first end of the first piston component is directed to the first supply-return line.

10. The system of claim 9, wherein:
the portion of the second piston component is configured to be displaced in the second direction by the second directional flow of the lubricating material received at the second end of
the second piston component, causing the lubricating material to flow to the first end of the second piston component;
the second end of the second piston component is operationally engaged with a second lubricating point line operationally engaged with one of the one or more first block lubricating points; and
the second directional flow of the lubricating material from the first end of the second piston component is directed to the second lubricating point line.

11. The system of claim 10, wherein, one or more of:
the second directional flow of the lubricating material is merely received at the second end of the second piston component upon displacement of the portion of the first piston component in the second direction; and
the second directional flow of the lubricating material is merely received at a second end of a third piston component upon displacement of the portion of the second piston component in the second direction.

12. The system of claim 1, wherein at least one flow control valve is disposed between the at least one of the at least two supply-return lines and the first series progressive component.

13. A lubrication block for use in a lubrication system having first and second supply-return lines operating in parallel and configured to be connected alternately to a source of lubricating fluid under pressure and to a reservoir to provide a flow of lubricating fluid to one or more first lubricating points, said lubrication block comprising:
first and second entry passages, the first and second supply-return lines being connected to said first and second entry passages, respectively,
a first piston with opposing end faces and movable in a cylinder in opposite axial directions,
a first pilot passage configured to supply lubricating fluid under pressure from said first entry passage to an end face of said first piston,
a second pilot passage configured to supply lubricating fluid under pressure from said second entry passage to the opposing end face of said first piston,
whereby, when lubricating fluid under pressure is supplied to one of said first and second supply-return lines and the other of said first and second supply-return lines is connected to the resevoir, the first piston moves in the first axial direction displacing fluid into said second pilot passage and so to the reservoir, and when lubricating fluid under pressure is supplied to the other of said first and second supply-return lines and said one of said first and second supply-return lines is connected to the reservoir, the first piston moves in a second axial direction displacing fluid into said first pilot passage and so to the reservoir,
a common supply passage,
a first supply channel directing lubricating fluid from said first entry passage to the common channel and having a check valve limiting flow in the opposite direction,
a second supply channel directing lubricating fluid from said second entry passage to the common channel and having a check valve limiting flow in the opposite direction, and
first and second lubricating fluid discharge openings, the first piston being configured to enable the flow of lubricating fluid from the common channel to one of the first and second discharge openings when the prison moves in one axial direction and to the other of the first and second discharge openings when the first piston moves in the opposite direction.

14. The lubrication block of claim 13 wherein said first and second entry passages each includes two openings, one of the openings to each entry passage being configured for connection to one of the first and second supply-return lines, and the other of each of said openings being configured for connection to conduits directing lubricating fluid to other blocks in the lubrication system, and each of the first and second entry passages being configured for the uninterrupted flow of lubricating fluid between its respective two openings.

15. The lubrication block of claim 14 further including a series progressive portion configured to receive lubricating fluid under pressure alternately from said first and second discharge openings.

16. A lubrication system comprising a first lubrication block according to claim 13 and a second lubrication block, said second lubrication block being connected to at least one of the other of said openings of said first and second entry passages.

* * * * *